April 7, 1959 R. H. PICKARD 2,881,333

TRANSISTORIZED COUNTER

Filed Sept. 23, 1955 2 Sheets-Sheet 1

INVENTOR
ROBERT H. PICKARD

BY W R Maltby
Howard White
ATTORNEYS

April 7, 1959 R. H. PICKARD 2,881,333

TRANSISTORIZED COUNTER

Filed Sept. 23, 1955 2 Sheets-Sheet 2

INVENTOR
ROBERT H. PICKARD

BY W R Malt[illegible]
[illegible] White ATTORNEYS

United States Patent Office
2,881,333
Patented Apr. 7, 1959

2,881,333

TRANSISTORIZED COUNTER

Robert H. Pickard, Alexandria, Va., assignor to the United States of America as represented by the Secretary of the Navy Application September 23, 1955, Serial No. 536,321

4 Claims. (Cl. 307—88.5)

(Granted under Title 35, U. S. Code (1952), sec. 266)

The invention described herein may be manufactured and used by or for the Government of the United States of America for governmental purposes without the payment of any royalties thereon or therefor.

This invention relates to multivibrator circuits used for obtaining pulse counting or frequency division. More particularly it relates to the use of two transistorized bistable multivibrator stages coupled together with a feedback network connected from the output of the second stage back to the first stage inactivating the first stage for a selected number of input pulses to thereby obtain a selected ratio of the number of input pulses to the first stage to the number of output pulses of the second stage.

It is known in the prior art that a bistable multivibrator stage is useful as a binary counter as it has two stable states which are characterized by an output of two voltage levels. The circuit can be triggered from one stable state to the other by the application of pulses of the same polarity to a common input terminal. One complete cycle of events occurs at the output of a bistable multivibrator stage for each two input pulses. Such a circuit will therefore count the input pulse with a "scale of two" or divide the input pulses by two. In addition it is known in the prior art to connect two bistable multivibrator stages together, the output of one stage providing the input to the other stage. Such a circuit will therefore count the input pulses with a "scale of four" or divide the input pulses by four. Moreover it is known that these bistable multivibrator stages can utilize the electrode semi-conductors known as transistors with their resulting advantages of size, ruggedness, etc.

The known systems, however, suffer from the initial disadvantage that they are limited to a division of two or multiples thereof. The present invention utilizes a feedback network between two stages of transistorized bistable multivibrators whereby the circuit will count the input pulses with a "scale of five or more" or divide the input pulses by five or more using approximately the same circuit elements previously limited to providing a scale of four or dividing a pulse frequency by four. As a result of the present invention counters and pulse frequency divider utilizing transistorized bistable multivibrators will be capable of more versatility in electrical systems.

It is an object of this invention to provide a pulse counter with a "scale of five" using two transistorized bistable multivibrators.

Another object of this invention is to provide a pulse counter with a "scale of six" using any two transistorized bistable multivibrators.

Still another object of this invention is to provide means of dividing the frequency of input pulses by five using only two transistorized bistable multivibrators.

Still another object of this invention is to provide means for dividing the frequency of input pulses by six using only two transistorized bistable multivibrators.

A still further object of this invention is to provide a pulse counter with an adjustable "scale of count" of four, five, six or more using only two transistorized bistable multivibrators.

Another object of this invention is to provide an input pulse frequency dividing means adjustable to divide by four, five, six or more using only two transistorized bistable multivibrators.

In accordance with the present invention each bistable multivibrator stage consists of two transistors each having a base electrode, an emitter electrode and a collector electrode. Each base electrode is grounded through a resistance and each emitter electrode is grounded through an impedance. A negative supply voltage is applied to each collector electrode through identical resistances. The base electrode of each transistor is cross connected with the collector electrode of the other transistor through an impedance circuit. The source of positive input pulses is connected to the base electrode of both of the transistors of the input multivibrator stage through a steering diode which blocks other than positive going pulses. The circuit and parameters have been selected to operate such that when one of the transistors is conducting the cross connection between base and collector electrodes maintains the other transistor in a non-conducting state. Also when the conducting transistor goes to the non-conducting condition the emitter bias voltage of the other transistor is such that the latter goes to the conducting condition and in turn holding the first transistor in the non-conducting condition. Each positive input trigger pulse will be applied to the base electrode of both transistors but it will be effective only to drive the conducting transistor to the non-conducting condition. When the conducting transistor goes to the non-conducting condition the cross connection of the base and collector electrodes allows the other transistor to conduct. On successive positive input pulses the conducting transistor is driven to the non-conducting condition and the non-conducting transistor goes to a state of conduction and so on.

The collector voltage, of the transistors of the input multivibrator appears as a square wave with one full cycle for every two positive input pulses. The collector voltage then contains a positive pulse for every two input pulses resulting in a pulse frequency division of two and thus is pulse counter with a "count of two."

The transistorized bistable multivibrator stage as described above results in a "count of two" and it is often called a binary counter, since it is used in systems utilizing the binary code.

If the collector voltage of the input bistable multivibrator is connected to the input of an identical second stage bistable multivibrator responsive only to positive going pulses, the collector voltage of one of transistors of the second stage would appear as a square wave with one full cycle for every two positive input pulses. Considering this voltage in terms of the input to the first stage, it makes one full cycle or one positive pulse for every four positive input pulses to the first stage. Operating in the above manner the two stages of transistorized of bistable multivibrator can be described as resulting in a pulse frequency division of four or as a pulse counter with a "count of four."

Now, according to the present invention the collector of the transistor providing the second stage square wave voltage output is connected to the base of the transistor in the first stage through a selected capacitor and resistor. As a result a feedback from the output of the second stage will modify the operation of the first stage. The feedback network can be characterized as a differentiating network composed of a capacitor, a resistor and the resistance in the first stage transistor base connection to ground. The network differentiates the collector voltage wave appearing at the output of the second stage and applies a portion of the peaked resulting voltage across the base resistance of the transistor in the first stage. Circuit parameters and connections are selected such that the polarity and magnitude of the decaying feedback voltage is sufficient to oppose and render ineffectual the positive input pulses applied by the triggering circuit across the same base resistancee, which pulses function to render the transistor non-conducting. The first stage bistable multivibrator is in this way rendered non-responsive to one or more of its positive input pulses. This action could also be described as a clamping action. Because the magnitude of the feedback voltage is decaying, after the passage of a predetermined period of time it will not render the positive input trigger pulses ineffective and the transistor will be again in condition to be driven to a non-conducting state. By placing a variable resistor in the feedback network the rate of decay of this voltage can be controlled. As a practical matter the rate of decay can be adjusted such that the magnitude of the feedback voltage is sufficient to render ineffective one or more positive trigger pulses. Also, the rate of decay of the feedback voltage can be adjusted such that no positive input trigger positive pulses are rendered ineffective. For reasons which will be made clear below only after every fourth effective positive input trigger pulse will the differentiated second stage feedback voltage have a sufficient magnitude of proper polarity such that any further positive trigger pulses to the first stage will be rendered ineffective. For example, by selectively varying the feedback resistance the first stage bistable multivibrator can be made non-responsive to every fifth or every fifth and sixth positive input triggering pulse. Also, if the decay rate is fast enough the first stage bistable multivibrator will be responsive to all the positive triggering pulses.

Figure 1:
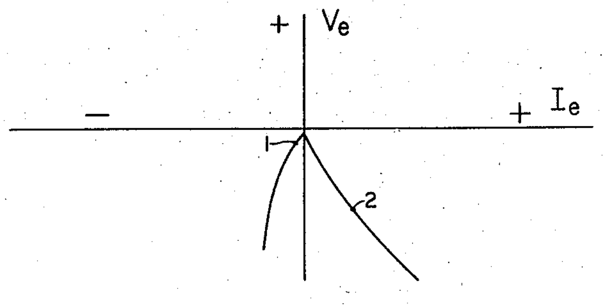
Fig. 1 illustrates the emitter voltage-current characteristic peculiar to the transistors which are utilized in the present invention.
Figure 3:
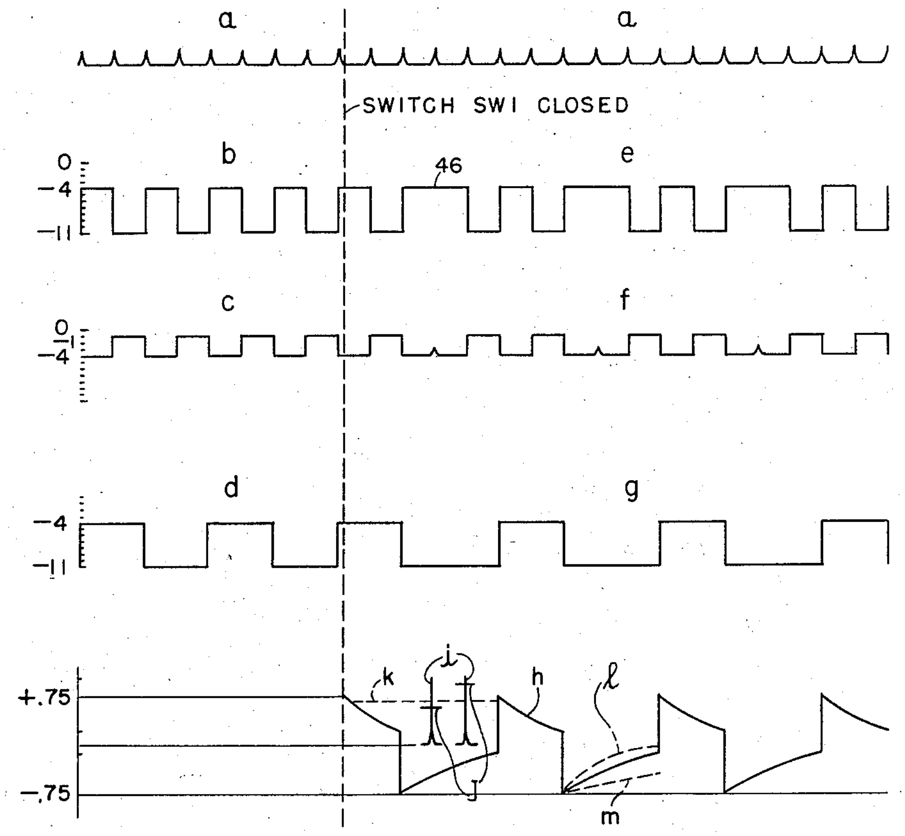
Fig. 3 is an enlarged graph illustrating voltages plotted with respect to time taken at particular points in the circuit of Fig. 2 in accordance with the present invention.
Figure 2:
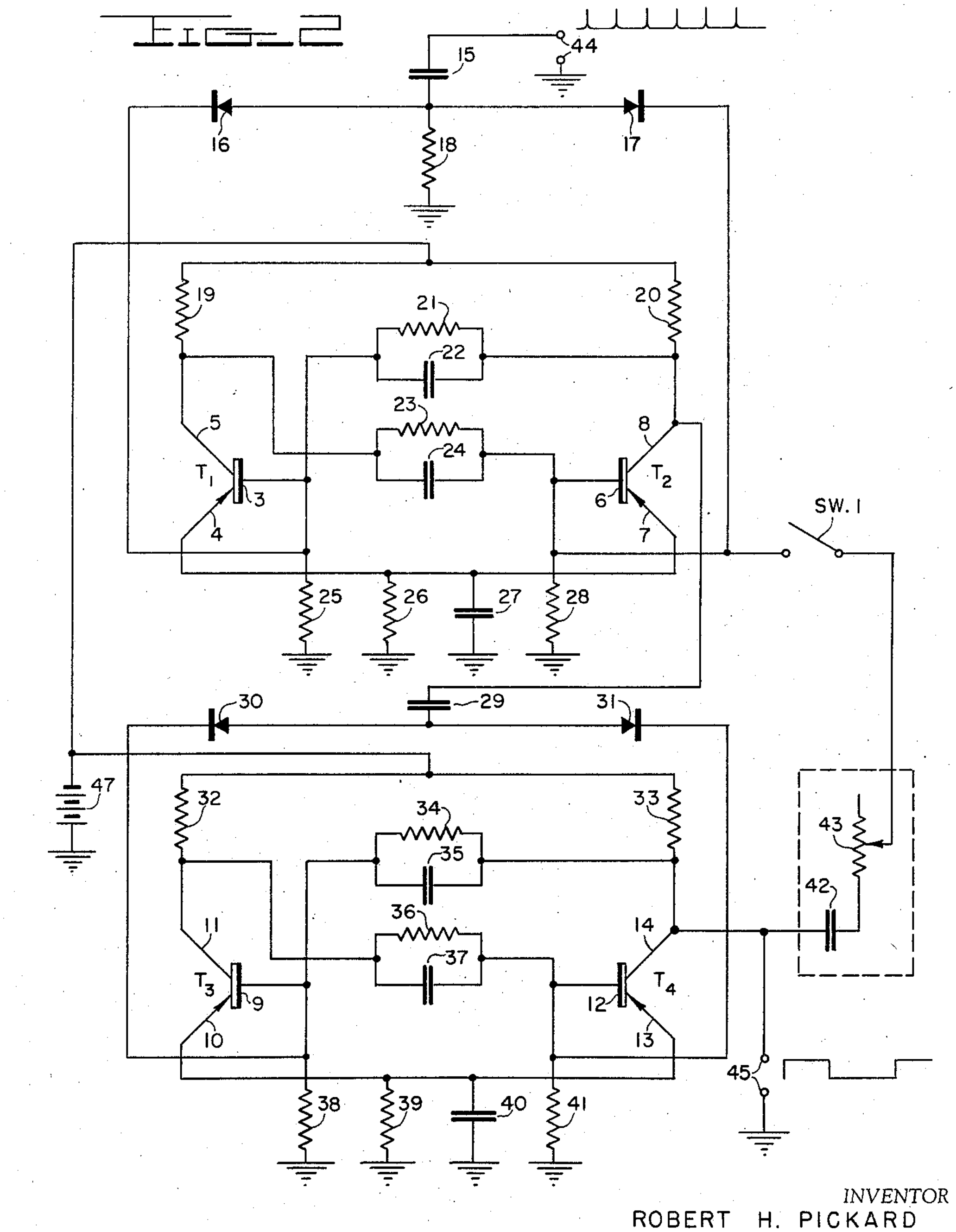
Fig. 2 is a circuit diagram of two connected stages of bistable multivibrators modified in accordance with the present invention.

For purposes of understanding this disclosure it should be remembered that in transistors the current from the emitter to the base (I) controls the larger collector current. Also, it should be remembered that in transistorized switching systems the instability inherent in transistors is utilized to best advantage. For example, Fig. 1 the $V_e$—$I_e$ characteristic illustrated therein has both a positive and negative slope or resistance portions. Point 1 represents the non-conducting operating point at approximately zero $I_e$ on the positive resistance slope of the characteristic, point 2 represents the conducting operating point of the transistor at a relatively large $I_e$ on the negative resistance slope of the characteristic. At point 2 the relative high $I_e$ causes the collector current to increase greatly. At point 1 with approximately zero $I_e$ the collector current is very low. In the discussion of Figs. 2 and 3, below, the transistor is rendered non-conducting by virtue of a positive pulse appearing at its base which results in an increased voltage drop across the base to ground resistance causing the $V_e$ to rise from operating point 2 to operating point 1.

Considering the invention now in greater detail, reference is made to Fig. 2 wherein there is illustrated two stages of transistorized bistable multivibrators. The first stage is made up of two transistors $T_1$ and $T_2$. Transistor $T_1$ being provided with a base 3, emitter 4, and collector 5. Transistor $T_2$ is provided with a base 6, emitted 7 and collector 8. Base 3 and base 6 are grounded through identical resistance 25 and 28 respectively. Emitter 4 is coupled directly to emitter 7 and both are grounded through resistance 26 and capacitance 27 in parallel. A low voltage negative supply 47 is applied to both collectors 5 and 8 through identical resistances 19 and 20 respectively. Base 3 is cross connected to collector 8 through resistance 21 and capacitance 22 in parallel. Base 6 is cross connected to collector 5 through resistance 23 and capacitance 24 in parallel. Positive input pulses from an external triggering circuit are applied to terminals 44, and through capacitance 15, and steering diode 16 to base 3 of transistor $T_1$. Likewise the positive inpul pulses from terminals 44 are applied through capacitance 15 and steering diode 17 to base 6 of transistor $T_2$. The pulse output of the first stage is taken from collector 8 of transistor $T_2$.

The second stage likewise comprises two transistors $T_3$ and $T_4$. Transistor $T_3$ is provided with base 9, emitter 10, and collector 11. Transistor $T_4$ is provided with base 12, emitter 13 and collector 14. Base 9 is grounded through resistance 38 and base 12 is grounded through resistance 41. Emitter 10 is directly connected to emitter 13 and both are grounded through resistance 39 and capacitance 40 in parallel. The low voltage negative supply 47 is applied to both collectors 11 and 14 through identical resistances 32 and 33 respectively. Base 9 is cross connected to collector 14 through resistance 34 and capacitance 35 in parallel. Base 12 is cross connected to collector 11 through resistance 36 and capacitance 37 in parallel. Positive input pulses for triggering the second stage are taken from the collector 8 of transistor $T_2$ and applied through capacitance 29 and steering diode 30 to base 9 of transistor $T_3$. Likewise the positive input pulses appearing at collector 8 of transistor $T_2$ are applied through capacitance 29 and steering diode 31 to base 12 of transistor $T_4$. The pulse output of the second stage is the voltage at collector 14 of transistor $T_4$ appearing at terminals 45.

The present invention utilizes a feedback network which could also be characterized as a clamping network connected from collector 14 of transistor $T_4$, the output of the second stage, through capacitance 42, variable resistance 43 switch *sw*1 to the junction of the base 6 of transistor $T_2$ and resistance 28. Resistance 43 is made variable for reasons which will become apparent in the disclosure below. Switch *sw*1 is included in the feedback or clamping network so that the operation of the two stages of transistorized bistable multivibrators can be operated with and without the feedback network.

Fig. 3 shows curves which are helpful in explaining the operation of Fig. 2. Voltage values are given to the curves of Fig. 3 for illustrative purposes only. The values chosen correspond with the use of a 14 volt negative voltage supply and are of value only relative to one another to illustrate the operation of the invention. Curve *a* illustrates the positive input pulses applied to terminals 44. Curve *b* represents the voltage at collector 8 of transistor $T_2$, with switch *sw*1 open, varying as a square wave toward and away from the negative supply voltage as transistor $T_2$ is driven to the non-conducting and conducting states respectively. It should be noted that curve *b* completes a cycle and has one positive pulse for every two positive input pulses of curve *a*. Curve *c* represents the voltage at base 6 of transistor $T_2$, which switch *sw*1 open varying as a square wave away from and toward ground potential as transistor $T_2$ is driven to the conducting and non-conducting states respectively. Curve *d* represents the voltage at collector 14 of transistor $T_4$, with switch *sw*1 open, varying as a square wave toward and away from the negative supply voltage as transistor $T_4$ is driven to the non-conducting and conducting states respectively. It should be noted that curve *d* completes a cycle and has one positive pulse for every four input pulses of curve *a*.

The curves *e*, *f*, *g* and *h* of Fig. 3 illustrate the operation of the two stages of transistor bistable multivibrators with switch *sw*1 closed and the feedback variable resistance 43 adjusted to a preferred selected value to result in a counter with a "count of five" or a frequency divider dividing the input pulse frequency by five.

Curve *e* represents the voltage at collector 8 of transistor $T_2$ varying as a rectangular wave toward and away from the negative supply voltage as transistor $T_2$ is driven alternatively to the non-conducting and conducting states respectively. It should be noted that curve *e* completes a cycle and has one positive pulse for every three positive input pulses.

Curve *f* represents the voltage at base 6 of transistor $T_2$ varying as a rectangular wave away from and toward ground potential as transistor $T_2$ driven to the conducting and non-conducting states respectively.

Curve *g* represents the voltage at collector 14 of transistor $T_4$ varying as a rectangular wave toward and away from the negative supply voltage as transistor $T_4$ is driven alternatively to the non-conducting and conducting states respectively. It should be noted that curve *g* completes a cycle and has one positive pulse for every five positive input pulses.

Curve *h* represents (on an expanded scale) a portion of the differentiated value of the voltage appearing at collector 14 of transistor $T_4$. The differentiating network consists of capacitance 42, variable resistance 43 and resistor 28. It is the differentiated portion of the collector voltage that appears across the resistor 28 which is shown in curve *h*. The voltage of curve *h* appears of course at the base 6 of transistor $T_2$ and opposes the action of the positive input pulses from terminals 44 such as to prevent temporarily the driving of transistor $T_2$ to the non-conducting state.

Superimposed on curve *h* are pulses *i* representing the positive triggering pulses appearing at base 6. Since the voltage of curve *h* and the voltage of the triggering pulses *i* are of opposite polarity it is their resultant which determines the base current through resistance 28 and whether or not transistor $T_2$ is rendered non-conducting. Cross marks *j* represent the resultant voltage of base 6 at the time of the positive triggering pulses *i*. Horizontal dotted line *k* represents the minimum magnitude of positive voltage which will act to drive transistor $T_2$ to the non-conducting state. It should be noted that the first cross mark *j* is below dotted line *k* and therefore the corresponding positive trigger pulse is unable to drive transistor $T_2$ to the non-conducting state. The next cross mark *j* is above the dotted line *k* and the corresponding trigger pulse is able to drive transistor $T_2$ to the non-conducting state.

Since it is the decaying magnitude of the curve *h* which determines the resultant voltage of base 6 at the time of the positive triggering pulses, it follows that adjustment of the variable resistance 43 which changes the time constant of the differentiating network and the decay rate of the curve *h* will also change the resultant voltage of base 6 at the time of the positive triggering pulses. Curve *l* represents the appearance of curve *h* when resistance 43 is adjusted to provide a very short time constant and resulting fast decay rate. As can be seen curve *l* can have such a fast delay that its magnitude never is sufficient to render a positive pulse ineffective. Therefore, the feedback is completely ineffective to alter the operation of the two stage transistorized bistable multivibrator.

Curve *m* represents curve *h* having a slow decay rate by virtue of variable resistance 43 being adjusted such that the feedback network has a long time constant. Because of the slow decay rate the feedback voltage magnitude can be such that it renders two successive positive trigger pulses ineffective.

Typical of the values found to provide satisfactory operation are the following:

Input triggering pulses 44=6.6 volt positive 100 kc.
Resistance 18=39K
Resistances 19, 20, 25, 28, 32, 33, 38, 41=3900
Resistances 21, 23, 34, 36=7500
Resistances 26, 39=1000
Variable resistance 43=0–33K
Capacitances 15, 21, 22, 24, 35, 37=500 $\mu\mu$f.
Capacitances 27, 40=.01 $\mu$f.
Capacitance 42=240 $\mu\mu$f.
Steering diodes 16, 17, 30, 31=INI26
$T_1$, $T_2$, $T_3$, $T_4$=PNP Type 2N64 transistors The following is the operation of the two stage transistorized bistable multivibrators of Fig. 2. With switch *sw*1 open and considering transistors $T_1$ and $T_3$ as being in the conducting state a positive trigger pulse from the input terminals 44 will raise the voltage of base 3 of transistor $T_1$. When the base 3 becomes instantaneously more positive on receiving the positive pulse the emitter current decreases since the emitter 4 is made instantaneously less positive with respect to the base 3. As a result transistor $T_1$ goes from operating point 2 to operating point 1 of Fig. 1 where the emitter voltage with respect to ground is more positive and the emitter current is negligible. Since in transistor theory conduction as a high collector current requires a high emitter current characterized by operating point 2, transistor $T_1$ is in a non-conducting state when at operating point 1. This same positive pulse will also appear at the base 6 of transistor $T_2$ but since that transistor is already at operating point 1 (non-conducting) it will be ineffective. However, when $T_1$ goes to the non-conducting state, its collector 5 goes toward the negative supply voltage in value making the base 6 of transistor $T_2$ more negative which in effect makes emitter 7 more positive with respect to base 6 resulting in an increase of emitter current and transistor $T_2$ going to operating point 2 (conducting state). Curve *b* of Fig. 3 illustrates the voltage of collector 8 of transistor $T_2$ going toward zero and away from the negative supply voltage as a result of the first positive input which drives transistor $T_1$ to the non-conducting state and transistor $T_2$ to the conducting state. Considering the negative supply voltage set at −14 volts collector 8 in the non-conducting state will have a value of about −11 volts and when transistor $T_2$ conducts, collector 8 will go to a value of about −4 volts. On the next positive triggering pulse, in the manner described above, transistor $T_2$ will move from operating point 2, the state of conduction, to operating point 1 the state of non-conduction and transistor $T_1$ will go to the conducting state. As a result of transistor $T_2$ going to the non-conducting state the voltage at collector 8 as shown in curve *b* will go toward the negative voltage supply and attain a final value of −11 volts. On succeeding pulses the collector 8 voltage will go from −11 volts to −4 volts then back again to −11 volts and so on, generating the square wave curve *b*. Collector 5 of transistor $T_1$ will generate a similar square wave directly out of phase with curve *b*. It is important to note that curve *b* has but one positive pulse for every two positive triggering pulses at the input of the first stage.

Curve *c* which is similar to curve *b* represents the voltage of base 6 of transistor $T_2$ triggered by each successive positive triggering pulse. Then transistor $T_2$ is in the conducting state, the voltage of base 6 has changed from −1 volt away from zero to −4 volts. When transistor $T_2$ is in the non-conducting state, the voltage of base 6 has changed from −4 volts toward zero to −1 volt. The voltage of base 6 represented by curve *c* varies as a square wave 180° out of phase with the voltage at collector 8 represented by curve *b*.

The voltage of collector 8 as represented by curve *b* is the output from the first stage and it is fed to the input of the second stage. Since the second stage triggering circuits contain steering diodes 30 and 31, it is responsive to only the positive going portions of curve *b*. And, since curve *b* only goes positive when transistor $T_2$ is driven to a stage of conduction, it is only then that the second stage receives a positive triggering pulse. Consider that on the first positive triggering pulse from the first stage the transistor $T_3$ is driven to non-conductive state and transistor $T_4$ goes to a conductive state and on the second positive triggering pulse from the first stage the transistor $T_4$ is driven to the non-conductive state and transistor $T_3$ goes back to a conductive state. Since the second stage contains the same parameters, value of negative supply voltage, etc., the voltage of collector 14 of transistor $T_4$ as represented by curve *d* forms a square wave varying from −11 to −4 volts with one positive pulse for every two positive input triggering pulses applied from the output of the first stage. Inasmuch as each stage has an output voltage with one positive pulse for every two positive triggering pulses, the output of the second stage, curve *d*, has one output pulse to every four positive traggering pulses applied to the input of the first stage, curve *a*.

With switch *sw*1 closed the two stages of transistorized bistable multivibrators of Fig. 2 are modified in operation in accordance with the present invention. Closing of switch *sw*1 inserts a capacitance 42 and variable resistance 43 between collector 14 of transistor $T_4$ and base 6 of transistor $T_2$. The capacitance 42, the variable resistance 43 and the resistance 28 form a differentiating network with the voltage of curve *h* appearing at base 6 of the transistor $T_2$. Curve *h* has both positive and negative voltage peaks of about .75 volt but it is only the negative peak which alters the response of transistor $T_2$ and the first stage to the positive triggering pulses shown in curve *a*. The decay characteristic of curve *h* is determined by the parameters of the differentiating network. The variable resistance 43 is set such that the frequency divider or counter illustrated in Fig. 2 will "divide by five" or give a "count of five." This is accomplished in the following manner. On curve *e* at the point of time indicated at 46, transistor $T_2$ normally would be driven to the non-conducting state and toward the negative supply voltage to a value of −11 volts by the corresponding positive triggering pulse of curve *a*. However, with the voltage of curve *h* being applied to the base 6 in opposition to the positive triggering pulses of curve *a* it will render them ineffective until the voltage of curve *h* has decayed to a point that the resultant positive pulse appearing at the base 6 has reached a minimum magnitude. Two positive triggering pulses *i* from curve *a* are super-imposed on curve *h* to scale. Cross marks *j* on the trigger pulses *i* indicate the amplitude of the resultant positive pulses applied to the base 6 of transistor $T_2$. Horizontal dotted line *k* indicates the necessary minimum magnitude of the resultant positive pulses which is required to drive transistor $T_2$ to the non-conducting state (operating point 1 of Fig. 1). Since the first cross mark *j*, corresponding to point 46 on curve *e*, is below horizontal dotted line *k* curve *e* at point 46 will not go toward the negative supply voltage. However, on the next positive triggreing pulse *i* the cross mark *j* is above the horizontal dotted line *k* allowing transistor $T_2$ to go to the non-conducting state with curve *e* going toward the negative voltage supply, from a value of −4 to −11 volts. Now since the positive portions of curve *h* (the feedback voltage) are ineffective in altering the operation of transistor $T_2$, the voltage of collector 8 will vary as shown in curve *e*. It will be observed from curve *a* that every fifth positive triggering pulse of curve *a* is ineffective in rendering transistor $T_2$ non-conductive or altering the operation of the first stage. It should be noted that curve *e* (representing the output of the first stage) contains two positive pulses for every five positive triggering pulses. The second stage as before is responsive to only positive pulses appearing in the output of the first stage. The second stage in producing curve *g* (the voltage at collector 14) in its output operates in the same manner as it did in producing curve *d*. Since the first stage produces two positive pulses for every five positive triggering pulses from terminals 44 and the second stage produces one positive pulse for every two positive pulses feed to its input, it follows that the second stage produces one positive pulse for every five positive input triggering pulses from terminals 44. The result is that the circuit Fig. 2 with the switch *sw*1 closed, and variable resistance 43 adjusted to a preferred value, operates as a pulse frequency divider dividing the input pulse frequency by five or stated differently as a pulse counter providing one output pulse for every five input pulses giving "a count of five".

As stated previously the decay rate of curve *h* can be modified by adjustment of variable resistance 43. Dotted curves *l* and *m* represent two different decay rates. The decay rate *l* is fast enough such that none of the positive triggering pulses applied to the first stage are rendered ineffective. When the decay rate of curve *l* is used, the output of the second stage is the same as curve *d* and the circuit of Fig. 2 operates to divide the input pulse frequency of terminals 44 by four (or as a pulse counter with a count of four).

The action of the feedback network from the output of the second stage altering the operation of the first stage could be described as a clamping action since its effect is to maintain the collector voltage of $T_2$ at a particular value for a period of time.

Curve *m* represents a slow rate of decay of the feedback voltage such that two successive positive triggering pulses are rendered ineffective in driving transistor $T_2$ to the non-conducting state. In this case, the output of the first stage has two positive pulses for every six positive triggering input pulses applied from terminals 44. Since the output of the second stage has one positive pulse for every two positive pulses in its input, it has one positive pulse in its output for every six positive triggering pulses applied to the first stage from terminals 44. The result is pulse frequency division, dividing the input pulse frequency by six or a pulse counter with a "count of six".

While the above described two stage transistorized bistable multivibrator has been shown to produce a counter or frequency divider which produces one output pulse for every four, five or six input pulses, it is within the skill of the art utilizing the present invention such that more than six input pulses produce only one output pulse.

While certain specific embodiments have been shown and described, it will of course, be understood that various modifications may be made without departing from the invention. The appended claims are, therefore, intended to cover any such modifications within the true spirit and scope of the invention.

What is claimed is:

1. In a pulse counter, a first bistable multivibrator comprising two semi-conducting devices each having a base electrode, an emitter electrode, and a collector electrode, resistance means individually grounding each base electrode, means connecting and grounding both emitter electrodes through an impedance, means for supplying a negative voltage to each collector electrode, impedance means cross-connecting each base electrode with the collector electrode of the other semi-conducting device, means for applying positive input pulses to the base electrode of both of said semi-conducting devices, the successive positive input pulses first triggering one of said semi-conducting devices to a stable conducting condition and the other to a stable non-conducting condition and on the succeeding input pulse triggering the conducting device to a stable state of non-conduction and the non-conducting device to a stable state of conduction, a second bistable multivibrator comprising two semi-conducting devices each having a base electrode, an emitter electrode, and a collector electrode, resistance means individually grounding each base electrode, means connecting and grounding both emitter electrodes through an impedance, means for supplying a negative voltage to each collector electrode, impedance, means cross-connecting each base electrode with the collector electrode of the other semi-conducting device, means for applying positive input pulses to the base electrode of both of said semi-conducting devices, the successive positive input pulses first triggering one of said semi-conducting devices to a stable conducting condition and the other to a stable non-conducting condition and on the succeeding input pulse triggering the conductive device to a stable state of non-conduction and the non-conducting device to a stable state of conduction; said second bistable multivibrator connected to receive an input from the collector electrode of one of the semi-conductor devices of said first bistable multivibrator, and feedback network means connected between the collector electrode of one of the semi-conductor devices of said second bistable multivibrator and the base of the semi-conductor device of the first bistable multivibrator comprising a resistor and a capacitor connected in series.

2. A frequency divider for use with a pulse train source comprising first and second pulse counters, each of said pulse counters being operative to produce one output pulse per a selected number of input pulses; means for connecting the input of said first counter to said pulse train source; means connecting the output of said first counter to the input of said second counter; means for interrupting the operation of said first counter for the duration of *n* pulses from said pulse train source, where *n* is an integer; time delay means connecting the output of said second counter to said interrupting means such that said interrupting means is operative in response to an output pulse therefrom, said delay means having a delay time constant at least equivalent to the time interval between input pulses from said pulse train source.

3. A frequency divider for use with a pulse train source comprising first and second binary pulse counters, each of said pulse counters being operative to produce one output pulse per two input pulses; means for connecting the output of said first counter to the input of said second counter; means for interrupting the operation of said first counter for the duration of *n* pulses from said pulse train source, where *n* is an integer; time delay means connecting the output of said second counter to said interrupting means such that said interrupting means is operative in response to an output pulse therefrom; said delay means having a delay time constant at least equivalent to the time interval between input pulses from said pulse train source.

4. A frequency divider according to claim 3 wherein said delay means comprises a capacitive element and a resistive element electrically connected in series.

References Cited in the file of this patent

UNITED STATES PATENTS

| | | |
|---|---|---|
| 2,375,950 | Schlesinger | May 15, 1945 |
| 2,591,961 | Moore et al. | Apr. 8, 1952 |
| 2,620,440 | Baker et al. | Dec. 2, 1952 |
| 2,665,845 | Trent | Jan. 12, 1954 |
| 2,760,087 | Felker | Aug. 21, 1956 |